United States Patent Office 3,290,166
Patented Dec. 6, 1966

3,290,166
METHOD FOR THE DECORATIVE COLORING OF POLYOLEFINS
John O. Sharp, George R. Greear, and John W. Tamblyn, Kingsport, Tenn., assignors to Eastman Kodak Company, Rochester, N.Y., a corporation of New Jersey
No Drawing. Filed Apr. 18, 1963, Ser. No. 273,823
6 Claims. (Cl. 117—37)

This invention relates to the permanent marking of polyolefins and in particular relates to a new method for forming a permanent pigmented or dyed insignia, decoration or other marking on high-molecular-weight polyolefins such as polyethylene and polypropylene.

Many methods and techniques are available for forming permanent markings on polymeric materials but these processes generaly are complicated by their use of pigment or dye dispersing mediums such as organic solvents and the like, and also by the necessity for oxidation of the article surface prior to application of the pigment or dye. High speed production of such polymer-constituted articles as polyethylene bowling pins or signs is particularly well suited for the present invention which obviates the need for the aforesaid solvent-dispersing mediums and oxidation step.

The objects of the present invention are to: provide a greatly simplified process for marking and decorating formed articles of polyolefinic material; and to improve the quality and permanency of such markings.

These objects are achieved according to the present invention by the process of incorporating pigment or dye material into low-molecular-weight polyolefins, such as polyethylene and polypropylene wax materials, applying the wax in the desired pattern to the formed polymeric article and thereafter heating the applied wax to cause it and the pigment or dye to diffuse into the polymeric article a sufficient depth to prevent removal of the pigment or dye by means accompanying normal use of the article. Though the exact nature of this improved embedding phenomena is not entirely understood, it is thought that the similarity between the article composition and the wax fosters penetration of the wax into the surface of the article to thereby provide a substantially higher degree of tenacity of the pigment or dye to the article than has been heretofore possible by conventional techniques, for example, of merely drying solvent-carried pigments and dyes on the surface of the articles.

Though a wide variety of hydrocarbon waxes may be employed, those found to be particularly useful in the present invention are those having a molecular weight of between about 1,000 and 15,000, such as the Epolene waxes which are Eastman's low-molecular-weight polyethylene compositons. The designations and properties of these materials are shown in the following chart:

| Properties | Emulsifiable Types | | | | |
|---|---|---|---|---|---|
| | E-10 | E-11 | E-12 | E-13 | E-14 |
| Ring and Ball Softening Point (° C.) | 105 | 101.5 | 107 | 105 | 101 |
| Penetration Hardness, 100 g./5 sec./77° F. (tenths of mm.) | 2 | 2.5 | 1.5 | 2 | 3.5 |
| Density, 77° F | 0.940 | 0.938 | 0.950 | 0.940 | 0.935 |
| Acid Number | 14.4 | 15 | 14 | 14.4 | 14 |
| Brookfield Viscosity, Cp.: | | | | | |
| 125° C. (257° F.) | 1,300 | 375 | 410 | 1,300 | 190 |
| 150° C. (302° F.) | | | | | |
| 190° C. (374° F.) | | | | | |
| Color, Gardner Scale | 1 | 2 | 2 | 1 | 2 |
| Molecular Weight, approximate | 2,500 | 1,500 | 1,500 | 2,500 | 1,400 |

| Properties | Nonemulsifiable Types | | | | | | |
|---|---|---|---|---|---|---|---|
| | N-10 | N-11 | N-12 | C-10 | C-11 | C-12 | 812A |
| Ring and Ball Sofetening Point (° C.) | 111 | 107.5 | 110 | 103.5 | 126 | 92 | 106 |
| Penetration Hardness, 100 g./5 sec./ 77° F. (tenths of mm.) | 1.5 | 2 | 1.5 | 2.5 | 1.0 | 11.5 | 2 |
| Density, 77° F | 0.927 | 0.925 | 0.937 | 0.906 | 0.947 | 0.897 | 0.912 |
| Acid Number | Nil | Nil | Nil | Nil | Nil | Nil | Nil |
| Brookfield Viscosity, Cp.: | | | | | | | |
| 125° C. (257° F.) | 1,990 | 390 | 364 | | | 900 | |
| 150° C. (302° F.) | | | | 8,700 | 20,000 | | |
| 190° C. (374° F.) | | | | | | | 70,000 |
| Color, Gardner Scale | 1 | 1 | 1 | 1 | 1 | 1 | 1 |
| Molecular Weight, approximate | 2,500 | 1,500 | 1,500 | 7,000 | 10,000 | 3,700 | 10,000 |

The processes for producing these waxes include: (1) direct synthesis; (2) thermal degradation of high-molecular-weight polyethylene; and (3) process (2) plus oxidation of either the immediate degradation product or said product after it has been hydrogenated as disclosed below.

The directly synthesized polyethylene waxes can be produced by the proper selection of polymerization conditions and catalyst. The temperature for the ethylene polymerization is within the range of 200–300° C. and the pressure usually ranges from 600–1200 atmospheres. The catalyst for the reaction is either oxygen or a peroxygen type of compound. Among the catalysts that can be used are benzoyl peroxide, ditertiarybutyl peroxide, lauroyl peroxide, cumene hydroperoxide, tertiarybutyl perbenzoate, caprylyl peroxide, and the like. Telomer waxes such as polyethylene-isopropanol and polyethylene-isobutanol may also be utilized. These waxes are well known and may be prepared as disclosed in Patent No. 2,766,214.

The thermally degraded waxes are obtained by the degradation of high-molecular-weight polyethylene at temperatures within the range of about 200 to about 400° C. The thermal degradation time can vary considerably depending upon the degree of unsaturation and reduction in molecular weight desired. For example, the thermal degradation time can vary from about 10 seconds up to about 2 hours. In some instances, it may be desirable or necessary to heat the polymer for as much as 10 hours and more depending on the other conditions and the type of product desired. Normally, the degradation time and temperature are varied to obtain the desired viscosity range of the degraded product and the time-temperature combination is selected to yield the maximum rate of desired product at the most economical reaction conditions.

The thermal degradation is carried out in an inert atmosphere and in the substantial absence of reaction gases, such as oxygen, hydrogen and the like. Inert gases, such as nitrogen, argon, helium, and the like, can be used to blanket the polymer during the thermal degradation reaction.

The thermal degradation can be carried out either batchwise or in a continuous process. In a batch system a stirred vessel containing an inert gas, such as nitrogen, is charged with the polymer to be degraded and the polymer is heated to the desired temperature with adequate agitation and held at that temperature for a specific period of time. Any low boiling products of the thermal degradation reaction can be removed by gas stripping or vacuum stripping of the product. In a continuous system of operation, the polymer to be degraded is fed by an extruder or similar feeding mechanism to a heated tube or pipe. The rate of flow, and temperature of the heated tube are controlled to give the desired viscosity of the degraded material. The degraded polymer is then gas stripped of low boiling products or vacuum stripped by means of a brush still or other similar vacuum stripping means.

Usable variations of these waxes are obtained by hydrogenating the degradation products in order to reduce substantially the degree of unsaturation of the final oxidized product. The hydrogenation reaction can be carried out by use of a slurry or fixed bed process and the reaction can be conducted with or without a diluent for the degraded polymer. When a product having a molecular weight within the wax range is desired, the hydrogenation reaction can be readily carried out without a diluent or solvent since waxes are relatively easy to handle in the molten state. However, suitable paraffinic hydrocarbon diluents or solvents can be used if they are desired. The hydrogenation reaction can be carried out using suitable hydrogenation catalysts, for example, Raney nickel, nickel deposited on kieselguhr, nickel deposited on carbon or alumina, palladium deposited on carbon or alumina, sponge nickel, zirconium promoted nickel catalysts, and the like. During the hydrogenation reaction, hydrogen pressures varying from atmospheric up to 6,000 p.s.i.g. and higher can be used. Preferably, the hydrogen pressure is within the range of 50–2000 p.s.i.g. The hydrogenation temperature can vary from 100° C. up to 400° C. and higher and preferably the temperature is within the range of 150 to 350° C. It has been found to be quite effective during the reduction with hydrogen to maintain a positive flow of hydrogen through the reactor. A much more effective hydrogenation is accomplished in this manner than in a reaction vessel wherein a positive pressure of hydrogen is maintained.

The emulsifiable waxes may be obtained by oxidizing either the product of the above thermal degradation process or such product after it has been hydrogenated as set forth above. In either case the oxidation is carried out with oxygen or an oxygen-containing gas, usually air. For the oxidation reaction, gas pressures of oxidizing gas varying from atmospheric to 1,000 p.s.i. and higher can be used. The preferred pressure range varies from 50–500 p.s.i. The oxidation temperature is usually within the range of 100–225° C. and preferably within the range of 120–160° C. Usually, no catalysts are required for the oxidation reaction, but, if desired, any suitable oxidation catalyst can be used. During the oxidation reaction, substantially no cross-linking of the polymer chains takes place in the process. The contact times for the oxidation reaction vary with the temperature and pressure that have been selected for the reaction, and in most instances the contact time is within the range of one-half to 8 hours.

The resulting product has an acid number between 4 and 30, preferably between 12 and 18, and the oxidized product can be degassed by vacuum or other suitable means for removal of entrained oxidizing gas.

Useful polypropylene waxes include those disclosed, for example, in Patent 2,835,659. These waxes are obtained by the thermal degradation at 300–450° C. of polypropylene having an average molecular weight of above about 20,000. Other useful polypropylene waxes include those taught by Patent 2,828,296 and obtained by the oxidation of waxes formed by the thermal degradation of polypropylene as disclosed in the aforesaid Patent 2,835,659.

The choice of dye or pigment materials is not critical to the process and will depend upon the requirements of the article manufacturer. In general, any pigment or dye material may be blended into the wax and affixed to the polyolefin article by the present process. Some dyes will, of course, be more soluble than others in the wax and more readily blended therewith. Representatives of such useful materials are the following:

(I) Inorganic pigment:
    (a) Titanium dioxide
    (b) Lead chromate
    (c) Iron oxide (II) Organic pigment:
    (a) Carbon black
    (b) Copper phthalocyanines
    (c) Monastral red (III) Dyes:
    (a) Disperse dyes such as 2-nitro-4-sulfonamido-4-ethoxydiphenylamine and 4-(6'-methylsulfonyl-2-benzothiazolylazo) - N - $\beta$ - cyanoethyl - N - $\beta$ - hydroxyethylaniline.
    (b) Metal chelate dyes such as the complex formed by reacting nickel thiocyanate with 3-(6'-methoxy-2' - benzothiazoleazo) - N,N - di - $\beta$ - hydroxyethylaniline.
    (c) Other dye types such as premetalized, acid wool, oil soluble, vat, direct, basic, etc., are also useful. For an extensive list of pigments or dyes, see any text on the subject, for example, The Chemistry of Synthetic Dyes and Pigments, by H. A. Lubs, Reinhold Publishing Corporation, 1955.

The pigments may be incorporated into the wax materials by bringing the temperature of the waxes just above their melting point, i.e., until the wax is fluid, and admixing the pigment by stirring it in, using conventional powered stirring equipment. The blending of pigments into the waxes may also be accomplished by "Brabendering" or "Banburying" techniques. The dyes may be mixed by hand into melted waxes.

In carrying out the invention, a layer of polyolefin wax impregnated with the desired dye or pigment is placed in the form of a free film or by wax crayon on the surface of a polyolefinic article. For immediate adhesion of the colored wax it is preferred that the surface of the polyolefinic article be warm. The further heat required for the fusion and penetration of the wax is obtained by means of an electrical resistance heater, gas flame, or infrared radiation.

The following examples will serve to further illustrate the invention.

*Example No. 1*

Markings were made on a 1/16-inch sheet of polyethylene with a red wax crayon. Heat was then applied with a "heat gun" (resistance heater similar to a hair dryer) until the wax melted. After the article cooled, the image was embedded in the polyethylene to such an extent that it could not be removed by rubbing or scratching with a fingernail. The red pigment faded slightly on heating.

*Example No. 2*

Markings were made, as in Example 1, on a sheet of polyethylene (1/16-inch) with a crayon which was composed of Epolene C-12 (see chart) and approximately 20% carbon black. The finished article was like that in Example No. 1, but no fading occurred.

*Example No. 3*

A ring was drawn with a wax crayon around the neck of a bowling pin which was molded from high-density polyethylene. The bowling pin was then fastened into a glass blower's lathe, and a gas flame was applied to the pigmented coating. After cooling the pigment was deposited beneath the surface of the bowling pin to such an extent that it could only be removed by rigorous scraping with a knife blade.

*Example No. 4*

Twenty percent, by weight, of Mapico Red 297 (a heat stable pigment made by Columbian Carbon Company) was admixed into a melt of Epolene C-12. The subsequently cooled pigmented Epolene was then pressed into a film on a heated press. Letters were then cut from the Epolene film and put onto a 1/16-inch sheet of warm polyethylene. Further heating was obtained by means of an infrared lamp. The pigment was imedded into the finished article and showed no signs of discoloration of the red pigment which could not be easily rubbed or scraped off.

*Example No. 5*

The wax employed in Example No. 4 was deposited, by melt, onto aluminum foil. The reverse side of the foil strip was painted black. The coated aluminum foil was placed, black side out, around a 1/2-inch rod of polyethylene and rotated under the heat of an infrared lamp. After cooling the aluminum foil was removed leaving a red-colored band on the rod. The heat-absorbing powers of the black side of the aluminum foil made possible the use of less heat than that required in other applications.

*Example No. 6*

Another marking technique successfully employed is as follows: pigment or dyed wax pencil markings are made on a thin sheet of polyethylene (e.g., 1/8 inch thick). Onto this sheet is heat laminated (household iron) a sheet of Kodar polyester film (see Patent 2,901,-466 for the composition and preparation of this film). The wax is driven into the polyethylene as the lamination occurs to provide a marked, abrasion-resistant surface for the polyester film. This type of decorative coloration is of particular interest to the advertisement industry.

The invention has been described in detail with particular reference to preferred embodiments thereof but it will be understood that variations and modifications can be effected within the spirit and scope of the invention as described hereinabove and as defined in the appended claims.

The embodiments of the invention in which an exclusive property or privilege is claimed are defined as follows:

1. A process for permanently marking a polyolefin article comprising apvlying to the surface of said article a polyolefin wax having a molecular weight within the range of about 1,000 to about 15,000 and containing coloring material, and thereafter heating said wax material until fusion thereof and penetration into said article occurs.

2. A process for permanently marking a polyethylene article comprising applying to the surface of said article a polyethylene wax having a molecular weight within the range of about 1,000 to 15,000 and containing coloring material, and thereafter heating said wax material until fusion thereof and penetration into said article occurs.

3. A process for permanently marking a polyolefin article comprising admixing coloring materials into a polyolefin wax having a molecular weight within the range of about 1,000 to about 15,000, forming said wax into a thin character, placing said character in position on the article and heating said wax character to fuse the same and thereby permanently mark the article.

4. A process for permanently marking a warmed polyolefin article comprising admixing coloring materials into a polyolefin wax having a molecular weight within the range of about 1,000 to about 15,000, forming said wax into a thin character, placing said character in position on the warmed article and heating said wax character to fuse the same and thereby permanently mark the article.

5. A process for permanently marking a polyolefin article comprising admixing coloring materials into a polyolefin wax having a molecular weight within the range of about 1,000 to about 15,000, fusing and depositing said wax onto one side of aluminum foil, the other side of which is coated black, placing the wax coating against the article and heating the aluminum foil to fuse the wax coating and permanently mark the article.

6. A polyolefin article marked by the process of applying to the surface of said article a polyolefin wax material having a molecular weight within the range of about 1,000 to about 15,000 and containing coloring material, and thereafter heating said wax material until fusion thereof and penetration into said article occurs.

No references cited.

ALFRED L. LEAVITT, *Primary Examiner.*

W. L. SOFFIAN, *Assistant Examiner.*